United States Patent Office 3,576,848
Patented Apr. 27, 1971

3,576,848
CAUSTIC WASHING AS A METHOD OF PURIFYING ORGANIC UNSATURATED COMPOUNDS
Jon M. Johnson and Alfred G. Robinson III, Longview, Tex., assignors to Eastman Kodak Company, Rochester, N.Y.
No Drawing. Filed Oct. 2, 1967, Ser. No. 672,012
Int. Cl. C07c 69/54
U.S. Cl. 260—486         5 Claims

ABSTRACT OF THE DISCLOSURE

Alkyl methacrylates prepared by the hydrogen iodide-catalyzed oxidative dehydrogenation reaction are purified by washing with a dilute solution of sodium or potassium hydroxide to remove deleterious color and reduce iodine values.

This invention relates to a novel process for the purification of compounds prepared by the hydrogen iodide-catalyzed oxidative dehydrogenation reaction. More specifically, this invention concerns the use of caustic washing as a novel method of purification of methyl methacrylate prepared by the hydrogen iodide-catalyzed oxidative dehydrogenation of methyl isobutyrate.

The quality of methyl methacrylate produced by the above oxidative dehydrogenation process is at times inferior in two respects. The color of the final product frequently ranges from 50 to 300 APHA. More importantly, the methyl methacrylate produced by the above process frequently contains a level of iodides ranging from 50 to 1000 p.p.m. It is particularly pointed out, moreover, that the use of conventional purification techniques such as redistillation is not effective as a means of lowering the color or iodide content of the methyl methacrylate. The use of analytical methods such as gas chromatography using electron capture detectors reveal that the contaminating iodides are alkyl iodides such as methyl, ethyl, n-propyl, isopropyl, butyl, sec-butyl, isobutyl, allyl and propenyl iodides.

A number of absorbents were evaluated as a method of removing these alkyl iodides from methyl methacrylate. Typical absorbents tried and the results obtained are given in Table I. The data obtained showed that the use of absorbents was ineffective in removing the contaminating iodides. In the following table, 500 ml. of methyl methacrylate was treated with 100 ml. of absorbent for 2 hours. After filtration, the methyl methacrylate was distilled and analyzed for color and iodide content.

TABLE I.—REMOVAL OF COLOR AND IODIDES BY ABSORBENTS

| Absorbent | Color (APHA) | | Iodides (p.p.m.) | |
|---|---|---|---|---|
| | Initial | Final | Initial | Final |
| Activated carbon (BPL) | 100 | 90 | 250 | 202 |
| Silica gel (grade 59) | 100 | 100 | 250 | 254 |
| Alumina (Grade F-110) | 100 | 100 | 250 | 238 |
| Molecular sieve (3A) | 100 | 90 | 250 | 301 |
| Molecular sieve (4A) | 100 | 90 | 250 | 300 |
| Molecular sieve (5A) | 100 | 90 | 250 | 256 |

Methyl methacrylate was similarly treated with a variety of metals in an attempt to remove the contaminating iodides by either of the following reactions:

(1)        $2RI + M \rightarrow R-R + MI_2$ or (2)        $RI + M \rightarrow RMI$ 

The results obtained using metals are given in Table II. In general, the data shows that whereas the iodide content was reduced, the purified methyl methacrylate still had an undesirable high color value.

TABLE II.—REMOVAL OF COLOR AND IODIDES BY METALS [1]

| | Color (APHA) | | Iodides (p.p.m.) | |
|---|---|---|---|---|
| | Initial | Final | Initial | Final |
| Metal: | | | | |
| Copper | 100 | 300 | 150 | 41 |
| Aluminum | 100 | 40 | 150 | 150 |
| Zinc | 100 | 35 | 150 | 35 |
| Lead | 100 | 35 | 150 | 92 |
| Magnesium | 100 | 30 | 150 | 23 |

[1] Methyl methacrylate stirred at 65° C. with 10 percent of its weight metal for 2 hours and then distilled.

When methyl methacrylate was passed in the vapor phase over the above metals at 300° C., no improvement of the results reported in Table II was observed.

In view of the above unsatisfactory results, purification of methyl methacrylate by treatment with aqueous caustic was considered. The following equation gives the reaction involved.

$$RI + NaOH \rightarrow ROH + NaI$$

It is well known that for saturated primary alkyl iodides such as methyl, ethyl, n-propyl, butyl and isobutyl iodides the above reaction proceeds slowly and gives poor conversions to the corresponding alcohol. This was confirmed by preparing a synthetic mixture of methyl methacrylate with various alkyl iodides known to be present and washing this synthetic mixture with dilute aqueous caustic. The iodide content of the synthetic mixture was substantially unchanged. See Example 5 for a detailed description of this experiment.

Objects therefore of the present invention are: to provide methyl methacrylate of good color and having extremely low contaminating iodide content; and to provide a commercially practicable process for preparing such methyl methacrylate.

These and other objects hereinafter appearing have been attained in accordance with the present invention through the discovery that when methyl methacrylate is prepared by the oxidative dehydrogenation of methyl isobutyrate, treatment with dilute caustic gives a refined product containing only about 5 to 10 percent of the iodides initially present. In addition, a product having an APHA color of less than 5 is obtained. This result was unexpected and surprising. Moreover, it was established that the presence of sodium or potassium hydroxide is very important. The use of water alone does not reduce the initial iodide concentration (see Example 4). The use of other bases such as calcium hydroxide, sodium acetate, sodium carbonate or sodium bicarbonate give substantially inferior results as shown in the following table:

TABLE III.—REMOVAL OF COLOR AND IODIDES BY BASES

| Base | Concentration in water | Color (APHA) | | Iodides (p.p.m.) | |
|---|---|---|---|---|---|
| | | Initial | Final | Initial | Final |
| NaOH | 2 | 150 | 5 | 250 | 12 |
| KOH | 2 | 150 | 5 | 250 | 15 |
| Ca(OH)$_2$ | 2 | 80 | 25 | 98 | 104 |
| Sodium carbonate | 2 | 80 | 25 | 98 | 28 |
| Sodium acetate | 5 | 80 | 20 | 98 | 47 |
| Sodium bicarbonate | 5 | 150 | 35 | 250 | 67 |

One of the most surprising features of the caustic wash process is the extreme rapidity with which purification is effective. Contact times as low as 10 seconds are effective. It is difficult to fully comprehend the action of caustic washing as a method of purification. Analysis shows that primary alkyl iodides make up a major part of the contaminating iodides. Caustic washing is not effective in removing iodides from synthetic mixtures of methyl methacrylate and alkyl iodides, whereas methyl methacrylate prepared by the hydrogen iodide-catalyzed oxidative dehydrogenation of methyl isobutyrate can be readily purified by caustic washing, the net effect of caustic washing being the removal of color and reduction of iodide values to 10 percent of their initial value (starting e.g., with methyl methacrylate containing 150 p.p.m.).

The caustic washing may be carried out under a variety of conditions. Either sodium hydroxide or potassium hydroxide can be used as the base. The concentration of the base in water may be varied over a wide range. Caustic concentrations have been used ranging from 0.1 percent to 10 percent. It is preferred to use sodium hydroxide concentrations in water ranging from 0.5 to 3.0 percent. It is also advantageous in certain cases to use a caustic salt solution as the wash medium. This is particularly true when the organic unsaturated compound to be washed is of relatively low molecular weight and has appreciable water solubility. When washing methyl methacrylate, it is preferred to use a 10 percent aqueous sodium chloride solution into which the sodium hydroxide has been dissolved. The method of washing is not critical and may be carried out either continuously or batchwise. Similarly, the temperature at which the wash step is carried out may vary over a wide range. When the unsaturated organic compound being washed is an ester, such as methyl methacrylate, the wash step should be carried out at as low a temperature as possible in order to minimize hydrolysis of the ester group. As stated above, a surprising feature of the caustic wash step is the rapidity with which purification occurs. When washing methyl methacrylate, contact times as low as 30 seconds can be used. From a practical viewpoint, in washing methyl methacrylate it is preferred to use contact times ranging from 2 to 10 minutes. It is advantageous when washing esters, such as methyl methacrylate, to use the minimum contact time consistent with good phase separation in order to minimize ester hydrolysis.

The relative weight ratios used of caustic wash to organic unsaturated compound can be varied over wide limits. When washing methyl methacrylate, it is preferred to use weight ratios of methyl methacrylate to caustic wash of 20:1 to 5:1. When the unsaturated organic compound being washed is a carboxylic ester, it is advantageous to use as high a weight ratio of unsaturated ester to caustic wash as possible in order to minimize ester hydrolysis.

The following examples are given to illustrate our invention and are not to be construed as limiting the invention in any way.

EXAMPLE 1

Methyl methacrylate prepared by the hydrogen iodide oxidative dehydrogenation of methyl isobutyrate was analyzed for iodide content and color. The sample contained 250 p.p.m. of iodides and had a color of 100 APHA. Five hundred grams of this material was shaken for 30 seconds with 250 grams of 2 percent sodium hydroxide-10 percent sodium chloride aqueous solution at room temperature. The organic layer was separated and distilled at 100 mm. of Hg through a 15-plate Oldershaw column using a 10:1 vapor take-off ratio. The distilled methyl methacrylate was analyzed and was found to contain 21 p.p.m. iodides and had a color of less than 5 APHA.

EXAMPLE 2

An apparatus designed for continuous countercurrent washing of methyl methacrylate was set up. The wash column consisted of a 1¼-inch diameter glass tube that was 4 feet in length. The column was packed with Berl saddles. Methyl methacrylate was pumped continuously into the bottom of the column and a 2 percent sodium hydroxide-10 percent sodium chloride aqueous solution was continuously pumped into the top of the column. The washed methyl methacrylate was removed from the top of the column and the used caustic solution similarly removed from the bottom of the column. Methyl methacrylate having an iodide content of 250 p.p.m. and a color of 100 APHA was continuously fed the column at 25 ml. per minute. The caustic solution was similarly fed at 5 ml. per minute. Five hundred milliliters of the effluent-washed methyl methacrylate was distilled in the manner described in Example 1. The purified methyl methacrylate contained 18 p.p.m. iodides and had a color of 5 APHA.

EXAMPLE 3

A continuous countercurrent wash column was constructed for use in the pilot plant manufacture of methyl methacrylate. About 16,000 pounds of methyl methacrylate was continuously washed. The methyl methacrylate fed had an average iodide content of 500 p.p.m. and had an average color of 125 APHA. The caustic wash consisted of 2 percent sodium hydroxide-10 percent sodium chloride in aqueous solution. The weight ratios of methyl methacrylate to caustic wash fed was 3:1. The washed methyl methacrylate was distilled to give about 15,800 pounds of purified methyl methacrylate having an iodide content of 12 p.p.m. and a color of less than 5 APHA.

The following example illustrates the ineffectiveness of water washing as a method of removing iodides from methyl methacrylate.

EXAMPLE 4

Five hundred milliliters of methyl methacrylate was washed with four separate 500-ml. portions of water. The initial iodide content of the methyl methacrylate was 135 p.p.m. After washing was complete, the methyl methacrylate was distilled as described in Example 1. The purified methyl methacrylate had an iodide content of 122.

The following example illustrates the ineffectiveness of caustic washing as a method of removing iodides from a synthetic mixture of methyl methacrylate and alkyl iodides.

EXAMPLE 5

To 2400 ml. of pure methyl methacrylate was added 1 drop of 1-iodopropane, two drops of 3-iodopropene-1, three drops of 1-iodo-2-methylpropane, four drops of 2-iodobutane, and five drops of 1-iodobutane. By analysis this synthetic mixture contained 65 p.p.m. iodides. This mixture was washed with 1200 ml. of 2 percent sodium hydroxide-10 percent sodium chloride in aqueous solution. The resulting organic layer was distilled in the manner described in Example 1. The purified methyl methacrylate contained 51 p.p.m. iodides.

The invention has been described in detail with particular reference to preferred embodiments thereof, but it will be understood that variations and modifications can be effected within the spirit and scope of the invention as described hereinabove and as defined in the appended claims.

We claim:

1. The process of refining methyl methacrylate formed by the hydrogen iodide-catalyzed oxidative dehydrogenation of methyl isobutyrate comprising contacting the crude methyl methacrylate with aqueous sodium hydroxide prior to distillation.

2. The process of refining methyl methacrylate formed by the hydrogen iodide-catalyzed oxidative dehydrogenation of methyl isobutyrate comprising contacting the crude methyl methacrylate for at least ten seconds with aqueous sodium hydroxide prior to distillation.

3. The process of claim 2 wherein the concentration of sodium hydroxide in water ranges from 0.01 to 25 percent; the temperature at which the caustic wash is carried out ranges from 0° C. to 80° C.; the contact time ranges from 10 seconds to ten minutes; and wherein the weight ratio of crude methyl methacrylate to aqueous sodium hydroxide ranges from 50:1 to 1:50.

4. The process of claim 2 wherein the concentration of sodium hydroxide in water ranges from 0.5 to 5 percent; the temperature at which the wash is carried out ranges from 10° C. to 35° C.; the contact time ranges from 30 seconds to 5 minutes; and where the weight ratio of crude methyl methacrylate to aqueous hydroxide ranges from 25:1 to 1:1.

5. The process of claim 2 wherein the contact time ranges from ten seconds to ten minutes.

References Cited

UNITED STATES PATENTS 3,425,798  2/1969  Statman et al. _____ 260—486X

FOREIGN PATENTS 1,058,650  2/1967  Great Britain _____ 260—486

LORRAINE A. WEINBERGER, Primary Examiner

P. J. KILLOS, Assistant Examiner